United States Patent
Tokumoto et al.

(10) Patent No.: US 6,300,444 B1
(45) Date of Patent: Oct. 9, 2001

(54) PROCESS FOR PRODUCING BUTENE POLYMER

(75) Inventors: Yuichi Tokumoto, Chigasaki; Koichi Ohashi, Kawasaki; Toshio Okada, Yokohama; Tsutomu Takashima, Kawasaki, all of (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 0 days.

(21) Appl. No.: 09/529,511

(22) PCT Filed: Aug. 25, 1999

(86) PCT No.: PCT/JP99/04585

§ 371 Date: Apr. 15, 2000

§ 102(e) Date: Apr. 15, 2000

(87) PCT Pub. No.: WO00/11040

PCT Pub. Date: Mar. 2, 2000

(30) Foreign Application Priority Data

Aug. 25, 1998 (JP) .................................................. 10-254614
Sep. 4, 1998 (JP) .................................................. 10-267239

(51) Int. Cl.[7] ............................... C08F 4/14; C08F 10/10
(52) U.S. Cl. ............................ 526/237; 526/290; 528/501
(58) Field of Search .................................... 526/237, 290, 526/209, 212; 528/501

(56) References Cited

U.S. PATENT DOCUMENTS

| | | |
|---|---|---|
| 4,152,499 | 5/1979 | Boerzel et al. . |
| 5,408,018 * | 4/1995 | Rath .................................... 526/237 |
| 5,674,955 | 10/1997 | Kerr et al. . |
| 5,846,429 | 12/1998 | Shimizu et al. . |
| 5,962,604 * | 10/1999 | Rath .................................... 526/65 |
| 6,084,144 | 7/2000 | Takashima et al. . |

FOREIGN PATENT DOCUMENTS

| | | |
|---|---|---|
| 0 145 235 A1 * | 6/1985 | (EP) . |
| 9-227618 | 9/1999 | (JP) . |
| WO 96/40808 | 12/1966 | (WO) . |

* cited by examiner

*Primary Examiner*—Fred Teskin
(74) *Attorney, Agent, or Firm*—Hollander Law Firm, P.L.C.

(57) ABSTRACT

It is possible to produce butene polymer at high yield, which polymer contains 80 mol % or more of polymer molecules having terminal vinylidene structure and being low in the content of residual organic fluorine by a process comprising Step (I) to polymerize in liquid phase by adding complex catalyst composed of boron trifluoride, ether and alcohol and/or water in specified ratios to $C_4$ fractions and Step (II) to reduce the content of trimer and lighter components contained in the obtained polymer to 0.2% by weight or less by distillation.

12 Claims, No Drawings

PROCESS FOR PRODUCING BUTENE POLYMER

TECHNICAL FIELD

The present invention relates to a process for producing butene polymer having high reactivity and being low in organic fluorine content, using boron trifluoride complex catalyst. More particularly, the invention relates to an inexpensive process for producing butene polymer containing 80 mol % or more of molecules having highly reactive terminal vinylidene structure and of low organic fluorine content, by means of liquid-phase polymerization of hydro-carbons containing isobutene.

BACKGROUND ART

It is disclosed in U.S. Pat. No. 4,152,499 that polymer obtained by polymerizing pure isobutene using boron trifluoride complex catalyst, is butene polymer containing double bonds of vinylidene structure in a high ratio and that maleic modification using maleic anhydride or the like can proceed efficiently. The maleic-modified polybutene disclosed in this patent gazette is accepted as being preferable in view of its performance, economy and environmental protection as compared with the conventional maleic-modified polybutene that has been obtained through chlorination process.

Accordingly, in recent years, there have been made many a proposal for producing polybutene having a large content of vinylidene-type double bonds, using boron trifluoride complex catalyst. Such butene polymer has excellent reactivity to maleic anhydride, in addition, it has also excellent adaptability to epoxidation or the like.

It is more advantageous in view of economy to use butadiene raffinate obtained from large-scale production rather than the use of 100% pure isobutene as a starting material in order to obtain polybutene having larger content of vinylidene-type double bonds. However, the use of butadiene raffinate as a starting material is not acceptable in that the amount of remained fluorine in polymer (hereinafter referred to as "residual organic fluorine") that is prepared in the presence of boron trifluoride catalyst, is large. As this residual fluorine is organic fluorine, if the butene polymer of this type is used as an additive to fuel oil, fluorine compounds are produced during the combustion of the fuel oil and fluorine compounds are released into the air to cause possibly air pollution.

Specifically, in the polymerization using boron trifluoride-methanol complex catalyst, when pure isobutene is used as a starting material, residual fluorine content is as low as 5 ppm or less, meanwhile if butadiene raffinate is used as a starting material, residual fluorine content is generally as high as 60 ppm or more, which is usually 90 to 120 ppm.

In view of air pollution, because polymer containing such a high content of residual fluorine as mentioned-above is not preferable, polymer of low fluorine content is demanded.

In U.S. Pat. No. 5,674,955; there is disclosed a method for reducing the content of residual organic fluorine to a level lower than 40 ppm by subjecting raw material of butene mixture to polymerization after reducing 20% or more of 1-butene content through catalytic hydroisomerisation. According to the disclosure on examples, however, even when 1-butene content in feed material is reduced from 22% to 5% by weight, the organic fluorine content in polymers is barely reduced to 17 ppm. Furthermore, this method necessitates one additional process in order to reduce the content of 1-butene as pretreatment of starting material.

PCT Publication WO 96140808 discloses a method for reducing organic fluorine content by dividing polymerization process into plurality of steps. However, this proposal is also economically unfavorable in view of costs for both equipment and operation because this also necessitates additional processes likewise the above-mentioned method.

It is an object of the present invention to provide an efficient process for preparing butene polymer having high reactivity in maleic-modification and epoxidation and the content of residual fluorine being reduced to an acceptable level for practical use without accompanying substantial increases in investment in equipment and also in additional cost for starting material.

DISCLOSURE OF INVENTION

Accordingly, a first aspect of the present invention relates to a process for preparing butene polymer which contains 80 mol % or more of polymer molecules having terminal vinylidene structure and less content of residual organic fluorine, which process comprises the following Steps (I) and (II):

Step (I): to carry out polymerization in a liquid phase at a temperature of −100° C. to +50° C. with a residence time of 5 minutes to 4 hours by introducing a starting material of a $C_4$ fraction comprising butene-1, butene-2, isobutene and butanes into a polymerization zone, in which complex catalyst composed of boron trifluoride, ether and alcohol and/or water is in a ratio of 0.05 to 500 mmol in terms of boron trifluoride relative to 1 mol of olefin components in the above starting material; and Step (II): to reduce by distillation trimer or lighter components contained in polymer obtained in Step (I) to 0.2% by weight or less.

A second aspect of the present invention relates to a process for preparing butene polymer as described in the first aspect of the invention, wherein the starting material is $C_4$ fraction comprising 10 to 40% by weight of butene-1, 1 to 40% by weight of butene-2, 35 to 70% by weight of isobutene, 10 to 30% by weight of butanes and 0.5% by weight or less of butadiene. A third aspect of the present invention relates to a process for preparing butene polymer as described in the first aspect of the invention, wherein the complex catalyst comprises boron trifluoride, ether, and alcohol and/or water in the molar ratio as defined by the following Equation (1), wherein the symbol x is a numeral in the range of 0.005 or more but less than 0.3, thereby reducing residual organic fluorine content to 30 ppm or less in terms of fluorine atom.

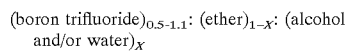

(boron trifluoride)$_{0.5-1.1}$: (ether)$_{1-x}$: (alcohol and/or water)$_x$     Equation (1)

A fourth aspect of the present invention relates to a process for preparing butene polymer as described in the first aspect of the invention, wherein the ether comprises aliphatic ethers having 2 to 16 carbon atoms.

A fifth aspect of the present invention relates to a process for preparing butene polymer as described in the first or fourth aspect of the invention, wherein the ether comprises dialkyl ethers (two alkyl groups can be the same or different), the number of carbon atoms of each alkyl group is 1 to 8 and each carbon atom bound to oxygen atom is primary carbon atom.

A sixth aspect of the present invention relates to a process for preparing butene polymer as described in the first aspect of the invention, wherein the alcohol comprises linear or branched chain aliphatic alcohols having 1 to 21 of carbon atoms.

A seventh aspect of the present invention relates to a process for preparing butene polymer as described in the first aspect of the invention, wherein the conversion of isobutene in the Step (I) is in the range of 60 to 100%.

A eighth aspect of the present invention relates to a process for preparing butene polymer as described in the first aspect of the invention, wherein complex catalyst composed of boron trifluoride, ether, and alcohol and/or water is introduced into a polymerization zone with a ratio of 0.05 to 10 mmol in terms of boron trifluoride with respect to 1 mol of olefin components of starting material in the Step (I).

A ninth aspect of the present invention relates to a process for preparing butene polymer as described in the first aspect of the invention, wherein the number average molecular weight of butene polymer is in the range of 500 to 15,000.

A tenth aspect of the present invention relates to a process for preparing butene polymer as described in the first aspect of the invention, wherein the complex catalyst comprises boron trifluoride, ether, and alcohol and/or water in the molar ratio as defined by the following Equation (II) in which the numeral x is in the range of 0.005 or more but less than 0.1, thereby reducing the content of residual organic fluorine to 10 ppm or less in terms of fluorine atom.

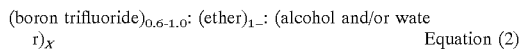

(boron trifluoride)$_{0.6-1.0}$: (ether)$_{1-}$: (alcohol and/or water)$_x$    Equation (2)

The present inventors have found out that it is possible to produce butene polymer containing less content of residual fluorine when complex catalyst composed of dialkyl ether singly as a complexing agent (hereinafter sometimes referred to as "ether-type complex") is used. Due to the low catalyst activity, however, a relatively large amount of catalyst is required in order to maintain a high conversion rate for isobutene.

On the other hand, when complex catalyst of singly alcohol or water (herein after sometimes referred to as "alcohol-type complex") is used as a complexing agent, it is possible to maintain a high conversion rate of polymerization, due to its high catalytic activity, with the amount of catalyst as small as ½ to 1/20 of the amount of ether-type complexes. However, when the alcohol-type complex is used for mixed butene as starting material, it causes problem that the content of residual fluorine in butene polymers increases.

The present invention provides a polymerization method, in which opposed effects can be produced in that the catalytic activity is high even when mixed butene is used as a starting material, what is more, the content of residual organic fluorine is small.

Therefore, according to the present invention, when the complex comprising boron trifluoride, ether, and alcohol and/or water (hereinafter sometimes referred to as "etherlalcohol-type co-complex") is used as catalyst and complex catalyst containing ether in which carbon atom bound to oxygen atom is primary carbon atom, is more than 70 mol % of the complexing agents, is used, although the mixed butene containing n-butenes such as butene-1 and butene-2 are used as the starting material, it is possible to maintain the catalytic activity at very high level as compared with ether-type complex catalyst such as boron trifluoride diethyl ether complex. It is also possible to reduce markedly the content of residual organic fluorine in butene polymer as compared with the use of alcohol-type complex catalyst such as boron trifluoride methanol complex.

Furthermore, the present inventors have found out surprisingly that when polymerization is carried out using ether/alcohol-type co-complex catalyst, most organic fluorine in formed polymer is unevenly distributed into the fraction of isobutene trimer having 12 carbon atoms or lighter components.

Based on these findings, it is possible to attain the intended reaction with small amount of catalyst by using etherlalcohol-type co-complex catalyst and by reducing the content of isobutene trimer and lighter components in the intended product to 0.2% by weight or less by distillation. In addition, the content of residual organic fluorine in butene polymer can be reduced to a level free from any practical problem, thereby accomplishing the present invention. Furthermore, according to the present invention, the so-called butadiene raffinate, i.e. the residue of butadiene stripping from $C_4$ fraction obtained by naphtha cracking, can be used intact as a starting material of isobutene. Therefore, it is possible to minimize the expenses for equipment investment and raw materials.

Therefore, according to the present invention, even when an inexpensive starting material such as butadiene raffinate containing olefins copolymerizable with isobutene such as butene-1 is used, it is possible to produce butene polymer containing 80 mol % or more of molecules having highly reactive terminal vinylidene structure as well as low content of residual organic fluorine at low cost and high yield.

After the reaction, distillation is performed for the purpose of removing unreacted components. However, it is usually impossible to reduce the content of residual organic fluorine by such distillation for removing unreacted components.

The present invention will be described in more detail.

In Step (I) according to the present invention, the polymerization of butadiene raffinate as described above is carried out in a polymerization zone (reaction zone) equipped with a reactor. As the reactor, any type of reactor can be used optionally such as stirred tank reactor or tubular reactor can be employed. It is possible to install plurality of reactors in the polymerization zone. Polymerization liquid containing unreacted components, formed butene polymer and catalyst, is discharge from the polymerization zone.

As the catalyst for polymerization according to the present invention, complex catalyst of boron trifluoride is employed and ether, preferably aliphatic ether is firstly exemplified as a complexing agent. Aliphatic ethers are those having 2 to 16 carbon atoms. More particularly, they are exemplified by dimethyl ether, methyl ethyl ether, diethyl ether, methyl propyl ether, ethyl propyl ether, dipropyl ether, methyl isobutyl ethyl ether, and diisobutyl ether.

Among aliphatic ethers, particularly suitable ones as complexing agents are dialkyl ethers represented by the formula, $R_1$—O—$R_2$. In the above formula, $R_1$ and R2 are saturated aliphatic hydrocarbons each having 1 to 8 carbon atoms, and each carbon atom bound to the oxygen atom of ether is primary carbon atom and both the $R_1$ and $R_2$ may be the same or different. Specific examples of dialkyl ethers represented by the above formula include dimethyl ether, methyl ethyl ether, diethyl ether, methyl propyl ether, ethyl propyl ether, dipropyl ether, methyl isobutyl ether and diisobutyl ether. These dialkyl ether can be used singly or in a mixture of them in an appropriate mixing ratio.

Second complexing agents used together with the above ethers are alcohols, preferably aliphatic alcohols. The aliphatic alcohols are exemplified by those having 1 to 21 carbon atoms. The alkyl groups of the aliphatic alcohols may be of linear or branched chain. The specific examples include methanol, ethanol, propanol, isopropanol, n-butanol, tert-butanol, and iso- or n-nonanol.

By the way, ether such as methyl tert-butyl ether, in which one of carbon atoms bound to oxygen atom is a tetiary carbon atom, easily decomposes into alcohol and olefin (in case of methyl tert-butyl ether, into methanol and isobutene) during the formation of complex with boron trifluoride or during polymerization reaction. The ether which decomposes into alcohol and olefin is mentioned as alcohol in the present invention.

In place of, or together with alcohols as the above second complexing agents, water can also be used as a second complexing agent. In other words, sufficient effect can be produced in the present invention with the combination of complexing agents of ether/alcohol/water in addition to the combination of ether/alcohol and ether/water. Accordingly, molar quantity and molar ratio concerning alcohol and water mean hereinafter the total quantity of alcohol and water unless otherwise indicated.

In the following paragraph, ether used in boron trifluoride/ether-alcohol co-complex catalyst is described with reference to dialkyl ether which is suitable aliphatic ether as represented by the foregoing formula $R_1$—O—$R_2$ unless otherwise indicated.

The boron trifluoride/ether-alcohol co-complex catalyst can easily be prepared according to the conventional methods. For example, it is prepared by blowing gaseous boron trifluoride with cooling into a mixture comprising the above ether and alcohol and/or water that is previously cooled below room temperature so as to attain desired coordination molar ratio. The aimed value in coordination molar ratio can easily be calculated from the weights of ether, alcohol and/or water and that of fed boron trifluoride gas. Furthermore, it is possible to form the complex in reaction system by separately introducing each of boron trifluoride, ether, and alcohol and/or water into the reaction zone.

Catalyst used in the present invention is a complex, in which the molar ratio of boron trifluoride, ether, and alcohol and/or water is defined by the following Equation (1) and x in the equation is in the range of 0.005 or more but less than 0.3.

(boron trifluoride)$_{0.5-1.0}$: (ether)$_{1-x}$: (alcohol and/or water)$_x$  Equation (1)

If the x in Equation (1) is 0.3 or more, it is not preferable because the content of residual organic fluorine in obtained butene polymer increases. On the other hand, if the x is less than 0.005, it is also not preferable because the catalytic activity of complex is lowered. It is generally possible to reduce the content of residual organic fluorine to 30 ppm or less by employing the above-described co-complex catalyst.

In order to reduce the content of organic fluorine remained in polymer to 10 ppm or less, the molar ratio among boron trifluoride, ether, and alcohol and/or water preferably meet the following Equation (2) and the x in the equation is in the range of 0.005 or more but less than 0.1, (boron trifluoride)$_{0.6-1.0}$: (ether)$_{1-x}$: (alcohol and/or water)$_x$  Equation (2)

If the x in Equation (2) is 0.1 or more, it is not preferable because the residual organic fluorine content in obtained butene polymer exceeds 10 ppm. On the other hand, if the x is less than 0.005, it is also not preferable because the catalytic activity of complex catalyst is lowered.

The feedstock used for polymerization is prepared, for example, by removing butadiene through extraction from $C_4$ fraction discharged from cracker of naphtha, light oil, kerosene, or butane in ethylene plant, which is hydrocarbon mixture consisting of unsaturated components such as butene-1, butene-2, isobutene and saturated components of butanes. More particularly, it comprises about 10 to 40% by weight of butene-1, about 1 to 40% by weight of butene-2, about 35 to 70% by weight of isobutene and about 0.5% by weight or less of butadiene as unsaturated components and about 10 to 30% by weight of butanes as saturated components (100% by weight in total). The feedstock is not especially limited so long as its composition meets this range. Thus, $C_4$ hydrocarbon fraction containing isobutene contained in the decomposition product obtained from fluidized-bed catalytic cracking (FCC) plant, can also be used.

The isobutene content in feedstock may be preferably high. The isobutene content in butadiene raffinate, however, is at most 70% by weight. The butadiene usually exists in small amount, if any, on the level as impurities. It is generally preferable to control water content in starting material to 10 ppm or less because it can act as complexing agent for boron trifluoride in the course of reaction. If the amount of water is too large, it is not preferable because catalyst activity is impaired or the content of residual organic fluorine increases.

The temperature of polymerization in Step (I) is in the range of −100° C. to +50° C., preferably in the range of −40° C. to +30° C. in order to carry out the reaction in liquid phase. If reaction temperature is below −100° C., it is not preferable because the reaction speed become low. On the other hand, if it is higher than +50° C., it becomes difficult to obtain intended products due to the occurrence of side reactions such as isomerization or rearrangement of skeletal carbon atoms.

The feed quantity of catalyst is in the range of 0.05 to 500 mmol as boron trifluoride with respect to 1 mol of olefin components of feedstock. It is preferably in the range of 0.05 to 50 mmol, more preferably 0.05 to 10 mmol. If it is less than 0.05 mmol, reaction hardly proceeds because the quantity of catalyst is too small. Furthermore, the use of catalyst more than 500 mmol is not preferable because it causes serious lowering of molecular weight as well as the increase in costs for catalyst and for after-treatment.

The controlling of molecular weight in the present invention can be achieved by regulating reaction temperature, molar ratio of ether, and alcohol and/or water, and coordination number in molar ratio of boron trifluoride with respect to ether, alcohol and/or water, and feed quantity of catalyst.

The reaction can be carried out either batchwise or continuously, however, it is more economical and efficient to carry out reaction continuously in view of industrial production. In the continuous process, contact time of complex catalyst with feedstock is important and the contact time of boron trifluoride/ether-alcohol co-complex catalyst with feedstock in polymerization reaction according to the present invention is preferably in the range of 5 minutes to 4 hours.

If contact time is shorter than 5 minutes, it is not possible to attain satisfactory conversion rate of isobutene component. On the contrary, if the contact time exceeds 4 hours, large economical loss is caused and also side reactions such as isomerization and rearrangement of obtained butene polymer are caused due to its prolonged contact time with catalyst, which are not desirable.

In view of industrially profitable production of butene polymer, it is preferable that the conversion rate of feed stock such as isobutene component in butadiene raffinate may be high. It is possible to attain 60 to 100% conversion rate of isobutene by employing the conditions according to the present invention.

The catalyst is partially recovered or removed from liquid reaction product that is discharged from reactor, as it stands or by an appropriate method. After that, the treated liquid is introduced into a deactivation tank to be neutralized and rinsed with water or alkali so as to remove complex catalyst from organic phase and only the organic phase is separated and recovered. The alkalis used for the neutralization and washing may be an aqueous solution of sodium hydroxide or solid such as slaked lime or gas such as ammonia as long as they can attain the purpose of deactivation of complex catalyst. Meanwhile, in the case that catalyst is completely removed from the reacted liquid by adsorption with any solid substance, the above operation of neutralization or washing can be omitted.

It is quite important to eliminate substantially the catalyst in advance as described above in order to suppress disagreeable side reaction such as isomerization of terminal vinylidene into internal olefin during the separation of components of specific molecular weights by distillation in Step (II).

The butene polymer produced according to the present invention contains 80 mol % or more of molecules having terminal vinylidene structure represented by the following formula.

Owing to the high content of the terminal vinylidene, the conversion rate in maleic modification or hydroformylation can be improved by using butene polymer prepared according to the present invention as a starting material. For example, it is possible to produce polybutenyl succinimide through maleic modification reaction in high yield.

The butene polymer prepared according to the process of the present invention has a polymer structure that is linked regularly with isobutene skeleton. The number average molecular weight (Mn) is preferably in the range of 500 to 15,000 and the value of Mw/Mn as measured by gel permeation chromatography (GPC) is in the range of 1.0 to 2.5 and the molecular weight distribution is narrow.

In Step (II) of the present invention, unreacted $C_4$ components and low molecule polymer in butene polymer are removed from the reaction liquid obtained in Step (I) by distillation. As described in the foregoing, the polymerized liquid in which catalyst is substantially removed, is subjected to the above distillation.

The method of distillation is not particularly limited as long as it insures reliable separation of butene trimer and lighter components. The distillation may be either batchwise or continuous. Furthermore, distillation can be done under either normal pressure or reduced pressure and steam distillation can also be employed.

It is preferable to reduce butene trimer and lighter components remained in butene polymer to 0.2% by weight or less through distillation, thereby making possible to reduce residual organic fluorine content in butene polymer to a level on which any problem is not caused in practical uses. If the butene trimer or lighter components exceed 0.2% by weight, it is not preferable because effective reduction of residual organic fluorine content is difficult.

The effect of distillation as described above is attributable to the fact that the residual organic fluorine is unevenly distributed in the butene trimer or lighter components. Therefore, it is difficult to reduce residual organic fluorine content even when the distillation is done for the purpose of separating only unreacted materials.

As far as it is possible to reduce butene trimer or lighter components to 0.2% by weight or less, tetramer or heavier components can be removed together by distillation in view of the convenience of operation.

BEST METHOD TO CARRY OUT THE EMBODIMENT OF THE INVENTION

The present invention will be described in more detail with reference to the following examples.

Butadiene raffinate containing isobutene (residue of butadiene extraction obtained from ethylene cracker) was used as feedstock. The composition of $C_4$ mixture was as follows (% by weight).

| | |
|---|---|
| Isobutene | 50.9 |
| Butene-1 | 23.2 |
| cis-Butene-2 | 2.8 |
| trans-Butene-2 | 6.4 |
| Isobutane | 5.4 |
| n-Butane | 11.3 |
| Total | 100.0 |

<Specification of Polymerization Apparatus and Method of Polymerization>

Polymerization was carried out using continuous polymerization apparatus.

A 2 liter reactor was used, which was equipped with inlet ports for starting material, boron trifluoride gas, ether, alcohol or water; and an outlet port. In addition, a variable speed stirrer, low temperature circulation cooling apparatus capable of constant temperature regulation, and indicator of polymerization temperature were attached. Furthermore, a deactivation tank and settling tank were connected to the outlet port.

Liquefied feedstock was fed into the reactor at a predetermined flow rate. The flow rate of feedstock was changed to vary contact time.

Continuous polymerization was done by feeding boron trifluoride gas through a flow control valve and ether and alcohol and/or water were fed by proportioning pump from respective inlets at predetermined flow rates.

The conversion rate of isobutene component in butadiene raffinate was calculated from the changes in composition of starting material and reacted liquid as determined by gas chromatography before and after the reaction.

The reacted liquid discharged from the reactor was introduced into the deactivation tank and it was washed with dilute aqueous solution of sodium hydroxide until complex catalyst was neutralized. After that, the organic phase was separated, dried and used as a feed material for distillation.

<Specification of Distillation Apparatus and Method of Distillation>

A vacuum pump and nitrogen line were provided to 2 liter (internal volume) batchwise distillation apparatus having 6 actual plate number in order to regulate pressure reduction degree and effect nitrogen seal. This distillation apparatus was fed with about 600 g of raw material prepared in the previous process and unreacted feed materials and fraction of $C_{12}$ or less were distilled off. The residual organic fluorine content in butene polymer remained in distillation still was measured.

The molecular weight of butene polymers was determined by GPC and the measurement of attribution and quantitative determination of molecular skeleton and terminal olefin structure were conducted using nuclear magnetic resonance apparatus (NMR).

<Measurement of Organic Fluorine Content>

Samples were subjected to combustion using Wickbold apparatus and absorbance was measured by developing the color of fluorine ion in the combustion solution with Alfusson reagent. With the value of absorbance and previously prepared calibration curb, the concentration of fluorine in the combustion solution was measured and the organic fluorine contents in samples were calculated.

<Determination of Timer and Lighter Components>

The determination of isobutene trimer and lighter components was done by means of GPC (trade name: LC-10A, made by Shimadzu Corporation. In this apparatus, divinylbenzene-styrene copolymer is used as stationary phase, and a columns packed with TSK gel G5000HXL, G4000HXL, G3000HXL and G2000HXL made by Tosoh Corporation, was connected. Temperature of column was maintained constant at 40° C. and RI detector was used.

EXAMPLE 1

The above-mentioned feedstock was fed to the above reactor at a flow rate of 2 liter/hour, so that the average contact time of olefin components with complex catalyst was regulated to 1 hour. Diethyl ether (special grade reagent) dried with metallic sodium and ethanol (special grade reagent) dried over molecular sieves 3A were used as complexing agents. The respective catalyst components were continuously fed with regulating their flow rates such that the ratio of boron trifluoride was 4.13 mmol to 1 mol of olefin component in feedstock and the molar ratios of boron trifluoride, diethyl ether and ethanol were 0.97:0.97:0.03. Polymerization was carried out with maintaining the temperature of reactor at −10° C. As a result, the conversion of isobutene was 94%.

Furthermore, 680 g of organic phase obtained by neutralization and water-washing of reacted liquid (residual organic fluorine content: 20 ppm) was fed to a distillation tower and distillation was carried out under reduced pressure of 2 mm Hg. Compositions of respective fractions and residual organic fluorine contents of butene polymers remained in distillation still at the ends of respective cuts were measured, results of which are shown in the following Table 1.

As being apparent in view of the table, when trimer and lighter components were almost distilled off (after the finish of fraction cut No.2), butene polymer remained in distillation still contained 0.11% by weight of trimer and lighter components and 7 ppm of residual organic fluorine. The number average molecular weight as determined by GPC was 1,462 and the content of polymer molecules having terminal vinylidene structure was 88 mol%.

TABLE 1

Results of Example 1

| | | Fraction Cut Number | | |
|---|---|---|---|---|
| | | 1 | 2 | 3 |
| Composition of Fraction Cut | | | | |
| Dimer Component | (wt. %) | 92.7 | 17.6 | 0.1 |
| Trimer Component | (wt. %) | 6.4 | 79.1 | 2.4 |
| Tetramer Component | (wt. %) | 0.9 | 3.3 | 71.0 |
| Pentamer Component | (wt. %) | — | — | 26.5 |
| Organic Fluorine Content in Fraction Cut | (ppm) | 103 | 78 | 20 |
| Butene Polymer in Distillation Still | | | | |
| Content of Trimer and Lighter | | | | |
| Components | (wt. %) | 1.60 | 0.11 | 0.11 |
| Organic Fluorine Content | (ppm) | 14 | 7 | 6 |

EXAMPLE 2

In Example 1, the feed quantity of boron trifluoride relative to 1 mol of olefin component of feedstock was changed to 8.27 mmol, molar ratios of ether and alcohol and coordination moles of boron trifluoride relative to complexing agent were accordingly changed so as to regulate them to the same values as those in Example 1, while other conditions were the same as those in Example 1, thereby carrying out polymerization. The conversion of isobutene was 95%.

Furthermore, 650 g of organic phase obtained by neutralization and water-washing of reacted liquid (residual organic fluorine content: 29 ppm) was fed to a distillation tower and distillation was carried out under reduced pressure of 2 mm Hg. The butene polymer remained in distillation still when timer and lighter components were almost distilled off, contained 0.13% by weight of trimer and lighter components and 5 ppm of residual organic fluorine. The content of polymer molecules having terminal vinylidene structure was 94 mol % and number average molecular weight was 540.

EXAMPLE 3

Diethyl ether in Example 1 was changed to dimethyl ether and ethanol was changed to methanol and other conditions were maintained the same as those in Example 1 so as to carry out polymerization. The conversion of isobutene was 96%.

Furthermore, 650 g of organic phase obtained by neutralization and water-washing of reacted liquid (residual organic fluorine content: 26 ppm) was fed to a distillation tower and distillation was carried out under reduced pressure of 2 mm Hg. The butene polymer remained in distillation still when timer and lighter components were almost distilled off, contained 0.12% by weight of trimer and lighter components and 5 ppm of residual organic fluorine. The content of polymer molecules having terminal vinylidene structure was 90 mol % and number average molecular weight was 1,247.

EXAMPLE 4

Flow rates were so regulated that molar ratios of boron trifluoride, dimethyl ether and methanol in Example 3 were 0.97:0.99:0.01 and other conditions were maintained the same as those in Example 3 to carry out polymerization. As a result, the conversion of isobutene was 93%.

Furthermore, 650 g of organic phase obtained by neutralization and water-washing of reacted liquid (residual organic fluorine content: 32 ppm) was fed to a distillation tower and distillation was carried out under reduced pressure of 2 mm Hg. The butene polymer remained in distillation still when timer and lighter components were almost distilled off, contained 0.14% by weight of trimer and lighter components and 6 ppm of residual organic fluorine. The content of polymer molecules having terminal vinylidene structure was 92 mol % and number average molecular weight was 1,049.

EXAMPLE 5

In Example 1, ethanol was changed to water and other conditions were maintained the same as those in Example 1 to carry out polymerization. As a result, the conversion of isobutene was 92%.

Furthermore, 620 g of organic phase obtained by neutralization and water-washing of reacted liquid (residual organic fluorine content: 36 ppm) was fed to a distiltion tower and distillation was carried out under reduced pressure of 2 mm Hg. The butene polymer remained in distillation still when timer and lighter components were almost distilled off, contained 0.07% by weight of trimer and lighter components and 13 ppm of residual organic fluorine. The content of polymer molecules having terminal vinylidene structure was 89 mol % and number average molecular weight was 1,780.

EXAMPLE 6

In Example 1, the content of boron trifluoride relative to 1 mol of olefin components in feedstock was changed to 0.83 mmol and continuous flow rates were so regulated that molar ratios of boron trifluoride, diethyl ether and ethanol were 0.96:0.85:0.15 and other conditions were maintained the same as those in Example 1 so as to carry out polymerization. As a result, the conversion of isobutene was 96%.

Furthermore, 620 g of organic phase obtained by neutralization and water-washing of reacted liquid (residual organic fluorine content: 88 ppm) was fed to a distillation tower and distillation was carried out under reduced pressure of 2 mm Hg. The butene polymer remained in distillation still when timer and lighter components were almost distilled off, contained 0.01% by weight of trimer and lighter components and 26 ppm of residual organic fluorine. The content of polymer molecules having terminal vinylidene structure was 91 mol % and number average molecular weight was 1,258.

COMPARATIVE EXAMPLE 1

In Example 1, feeding of diethyl ether was stopped and flow rate of boron trifluoride was so adjusted that its ratio relative to 1 mol of olefin components of feedstock was 0.83 mmol and further, the flow rate of ethanol was also adjusted so that the coordination molar ratio of boron trifluoride to ethanol was 0.63:1.00. Polymerization was then carried out with maintaining other conditions the same as those in Example 1. As a result, the conversion of isobutene was 96%.

Furthermore, 600 g of organic phase obtained by neutralization and water-washing of reacted liquid (residual organic fluorine content: 231 ppm) was fed to a distillation tower and distillation was carried out under reduced pressure of 2 mm Hg. The butene polymer remained in distillation still when timer and lighter components were almost distilled off, contained 0.02% by weight of trimer and lighter components and 93 ppm of residual organic fluorine. The content of polymer molecules having terminal vinylidene structure was 86 mol % and number average molecular weight was 913.

INDUSTRIAL APPLICABILITY

According to the present invention, even when an inexpensive reaction material such as butadiene raffinate containing n-butene or the like is used, it is possible to produce butene polymer containing 80 mol % or more of molecules having highly reactive terminal vinylidene structure, in which residual organic fluorine content can be reduced to 30 ppm or less, or to a low level of less than 10 ppm. Such a butene polymer hardly generate halogen compounds when it is used as a fuel additive, consequently it is very useful as a reactive butene polymer which does not cause air pollution.

What is claimed is:

1. A process for producing butene polymer containing 80 mol % or more of polymer molecules having terminal vinylidene structure, which process comprises the following Steps (I) and (II):

Step (I); carrying out polymerization in a liquid phase at a temperature of −100° C. to +50° C. with a residence time of 5 minutes to 4 hours by introducing into a polymerization zone a starting material of a $C_4$ fraction comprising butene-1, butene-2, isobutene and butanes, and a complex catalyst composed of boron trifluoride, ether and alcohol and/or water in a ratio of 0.05 to 500 mmol in terms of boron trifluoride relative to 1 mol of olefinic components in said starting material; and Step (II): reducing by distillation trimer and lighter components contained in polymer obtained in said Step (I) to 0.2% by weight or less.

2. A process for producing butene polymer in claim 1, wherein said starting material is a $C_4$ fraction comprising 10 to 40% by weight of butene-1, 1 to 40% by weight of butene-2, 35 to 70% by weight of isobutene, 10 to 30% by weight of butanes and 0.5% by weight or less of butadiene.

3. A process for producing butene polymer in claim 1, wherein said complex catalyst comprises boron trifluoride, ether and alcohol and/or water in the molar ratio as defined by the following Equation (1) wherein the symbol x is a numeral in the range of 0.005 or more but less than 0.3, thereby reducing residual organic fluorine content to 30 ppm or less as fluorine atom:

$$(\text{boron trifluoride})_{0.5-1.1}:(\text{ether})_{1-x}:(\text{alcohol and/or water})_x \quad \text{Equation (1)}.$$

4. A process for producing butene polymer in claim 1, wherein said ether comprises aliphatic ether having 2 to 16 carbon atoms.

5. A process for producing butene polymer as claimed in claim 1 wherein said ether comprises dialkyl ether wherein the two alkyl groups may be the same or different, the number of carbon atoms of each alkyl group is 1 to 8 and each carbon atom bound to the oxygen atom of the ether is a primary carbon atom.

6. A process for producing butene polymer in claim 1, wherein said alcohol comprises linear or branched chain aliphatic alcohol having 1 to 21 carbon atoms.

7. A process for producing butene polymer in claim 1, wherein the conversion of isobutene in said Step (I) is in the range of 60 to 100%.

8. A process for producing butene polymer in claim 1, wherein complex catalyst composed of boron trifluoride, ether and alcohol and/or water is introduced into a polymerization zone with a ratio of 0.05 to 10 mmol in terms of boron trifluoride relative to 1 mol of olefin components of said starting material in said Step (I).

9. A process for producing butene polymer in claim 1, wherein the number average molecular weight of said butene polymer is in the range of 500 to 15,000.

10. A process for producing butene polymer in claim 1, wherein said complex catalyst comprises boron trifluoride, ether and alcohol and/or water in the molar ratio as defined by the following Equation (2) wherein the symbol x is a numeral in the range of 0.005 or more but less than 0.1, thereby reducing the content of residual organic fluorine to 10 ppm or less in terms of fluorine atom:

$$(\text{boron trifluoride})_{0.6-1.0}:(\text{ether})_{1-x}:(\text{alcohol and/or water})_x \quad \text{Equation (2)}.$$

11. A process for producing butene polymer as claimed in claim 4 wherein said ether comprises dialkyl ether wherein the two alkyl groups may be the same or different the number of carbon atoms of each alkyl group is 1 to 8 and each carbon atom bound to the oxygen atom of the ether is a primary carbon atom.

12. A process for producing butene polymer in claim 1, wherein the residual organic fluorine content is reduced to 30 ppm or less as fluorine atom.

* * * * *